June 12, 1923.
F. KOPPENHAFER
VEHICLE DIRECTION INDICATOR
Filed Nov. 1, 1920
1,458,711
2 Sheets-Sheet 1
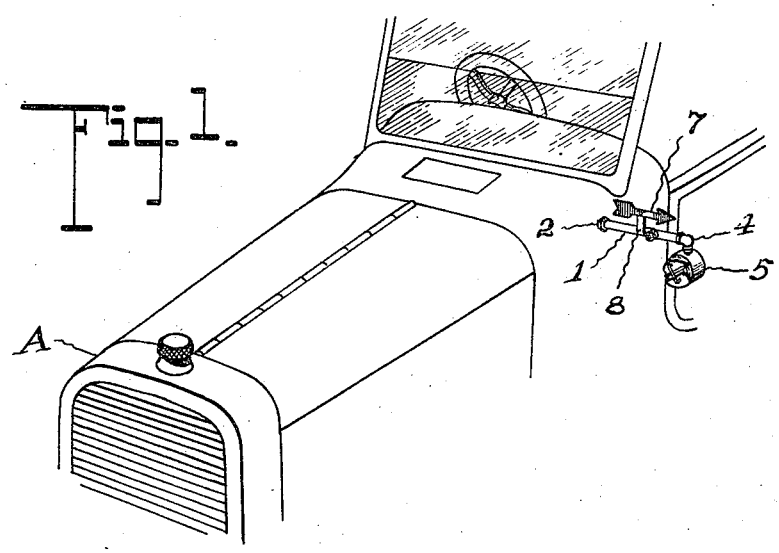
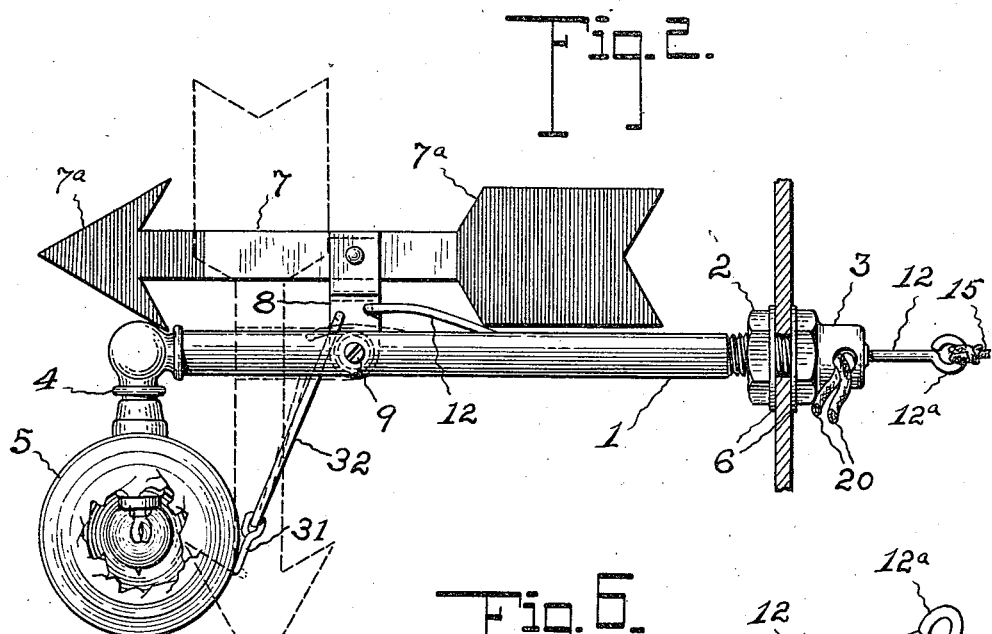
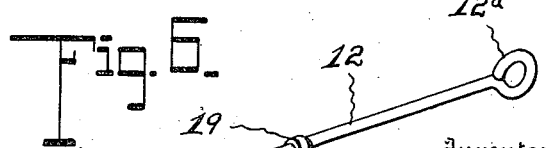
Inventor
Floyd Koppenhafer
Robt. Robbvltie
Witness:
E.F. Wagner.
By
Attorneys

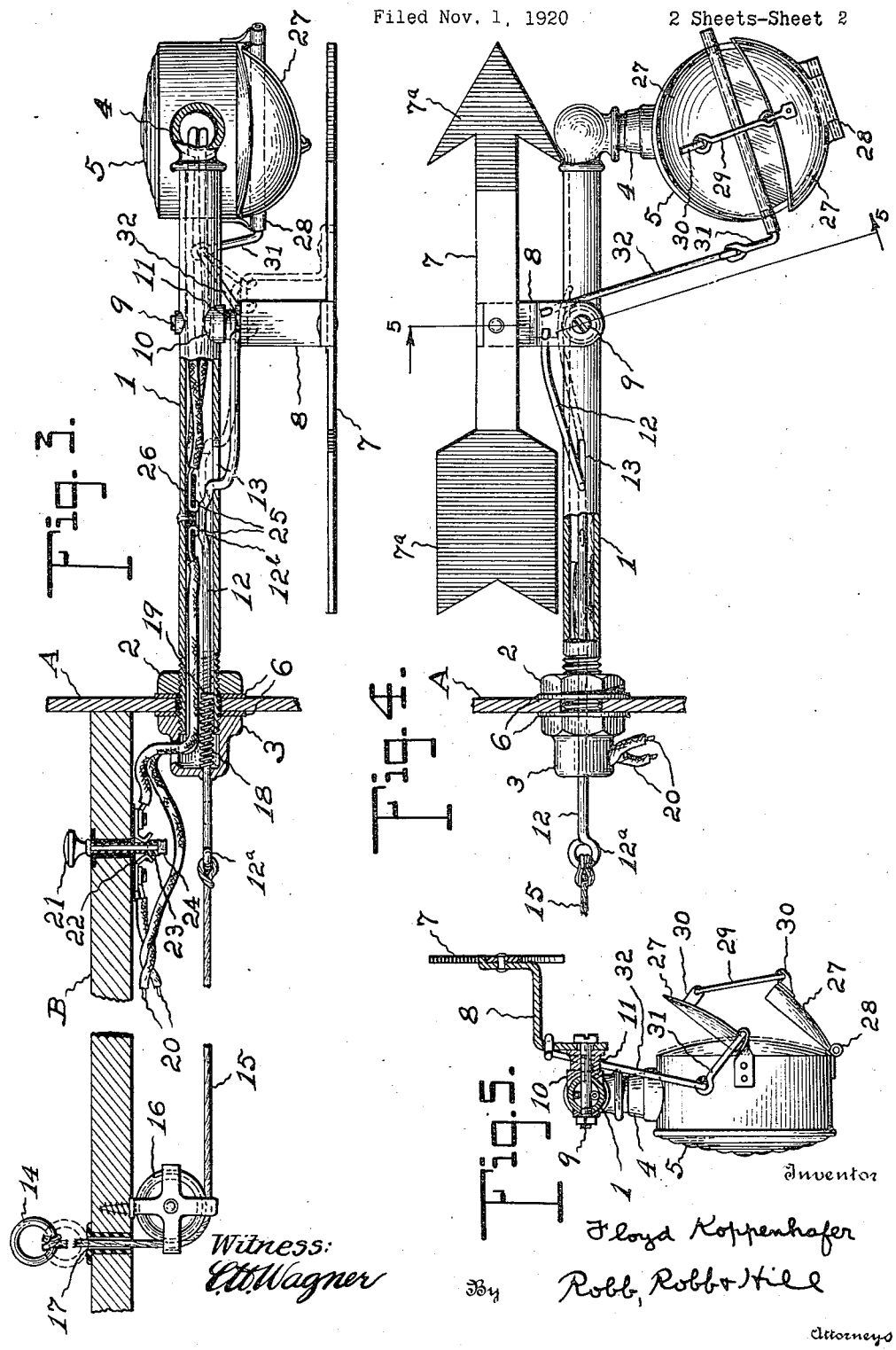

Patented June 12, 1923.

1,458,711

UNITED STATES PATENT OFFICE.

FLOYD KOPPENHAFER, OF SHINROCK, OHIO.

VEHICLE DIRECTION INDICATOR.

Application filed November 1, 1920. Serial No. 420,928.

*To all whom it may concern:*

Be it known that I, FLOYD KOPPENHAFER, a citizen of the United States, residing at Shinrock, in the county of Erie and State of Ohio, have invented certain new and useful Improvements in Vehicle Direction Indicators, of which the following is a specification.

The present invention relates to a vehicle direction indicator, and has for its object to provide a device of that character which embodies novel features of construction whereby the driver of a vehicle can signal in an effective manner to pedestrians and the drivers of other vehicles that he contemplates making a turn.

Further objects of the invention are to provide a vehicle direction indicator which can be readily mounted in operative position upon any vehicle, which can be easily and quickly manipulated by the driver of the vehicle, which will enable the contemplated change in direction on the part of the driver to be effectively signaled to others in advance so as to avoid the possibility of an accident, and which is comparatively simple and inexpensive in its construction.

With these and other objects in view the invention consists in certain combinations, arrangements and associations of the parts, as will more fully appear as the description proceeds, the novel features thereof being pointed out in the appended claims.

For a full understanding of the invention reference is to be had to the following description and accompanying drawings, in which:—

Figure 1 is a perspective view of the forward end of a motor vehicle, illustrating the manner of mounting the direction indicator upon a vehicle.

Figure 2 is an enlarged elevation of the direction indicator, the swinging arrow being shown by full lines in operative position and by dotted lines in inoperative position.

Figure 3 is an enlarged top plan view of the device together with fragmentary portions of the side and dashboard of the motor vehicle upon which the device is mounted, portions being broken away and shown in section to illustrate more clearly the details of construction.

Figure 4 is an elevation of the direction indicator, looking at the same from the reverse side of that shown by Figure 2.

Figure 5 is a transverse sectional view on the line 5—5 of Figure 4, looking in the direction of the arrows.

Figure 6 is a detail view of the semaphore operating rod, a portion thereof being broken away.

Corresponding and like parts are referred to in the following description and indicated on all of the views of the drawings by like reference characters.

Referring to the drawings, which illustrate one possible embodiment of the invention, the numeral 1 designates a bracket support which is preferably in the form of a tubular arm. The inner end of the arm is threaded and has a pair of clamping nuts 2 and 3 fitted thereon, while the outer end of the arm is provided with an elbow 4 which carries an electric signal lamp 5. The bracket is intended to be applied to the body of a vehicle so as to project laterally therefrom and, as indicated by Figure 1, the signal device is preferably mounted upon the forward end of the vehicle at a point slightly beyond the dashboard and wind shield. In Figure 1 the forward end of a motor vehicle is fragmentarily illustrated at A and in order to apply the direction indicator to the vehicle a small hole is formed in one side of the body of the vehicle at the proper place and the threaded inner end of the bracket arm 1 inserted through the hole or opening. The clamping nuts 2 and 3 are then manipulated so that the side wall of the vehicle body is tightly clamped between the same and the bracket arm thereby rigidly secured in position. Suitable washers 6 may be interposed between the clamping nuts and the wall of the vehicle body, as indicated by figures 2 and 3.

The bracket is preferably mounted in position so that it is substantially horizontal and the signal lamp 5 projects downwardly from the outer end thereof. An arrow or semaphore 7 is pivotally mounted upon the bracket arm 1 and arranged to be swung into a horizontal or operative position to indicate a turn, or into a vertical or inoperative position. The two end portions of the arrow 7 may be painted or colored red, as indicated at 7ᵃ so as to catch the eye and attract attention thereto. The middle portion of the arrow or semaphore 7 is provided with a lateral arm 8 which is pivotally mounted upon a bolt or pin 9 extending transversely through the bracket arm 1. A suitable bearing 10 may be provided upon the bracket arm, and a washer or spacing member 11 is shown as interposed between the bearing 10 and the member 8. The lateral arm 8, as indicated more clearly by Figure 5, preferably has a substantially Z shaped formation with the two ends thereof offset from each other. The arrow or semaphore 7 is thus supported at one side of the supporting arm 1 so that it will not strike against the signal lamp 5 as it is swung up and down.

An operating plunger 12 extends through the tubular arm 1 and has one end thereof offset laterally and extended through a slot or clearance opening 13 in one side of the tubular arm 1 so that it can be attached to the arm 8 of the arrow or semaphore. The other end of the operating plunger passes loosely through a guide opening in the specially formed clamping nut 3 at the inner end of the tubular arm 1, and is operatively connected to a finger piece 14 on a dashboard B of the vehicle. For this purpose the end of the plunger 13 is shown as terminating in an eye $12^a$ to which one end of a cable 15 is connected. This cable extends around a guide pulley 16 and then passes through an opening 17 in the dashboard, having the finger piece 14 attached to the extremity thereof. With this construction it will be obvious that a pull upon the finger piece 14 will result in sliding the plunger 12 inwardly and swinging the arrow or semaphore 7 upwardly into a substantially horizontal position, as indicated by Figure 4. When the arrow is in this position it will indicate that the driver of the vehicle contemplates making a turn in the direction toward which the arrow points. As soon as the finger piece 14 is released the arrow will be swung back into inoperative position by a spring 18 which surrounds the plunger 12 and is interposed between a shoulder 19 on the plunger and the nut 3, said spring being compressed when the plunger is moved to swing the arrow into operative position.

The invention further contemplates the provision of means whereby the signal lamp is flashed and the arrow or semaphore illuminated when the signal is operated, thereby rendering the device effective at night as well as during the day. The electric wires 20 for the lamp 5 extend through the tubular arm 1 and elbow 4, and a suitable switch is provided upon the dashboard B for manually controlling the lamp circuit so that the lamp can be rendered inoperative when driving during the day. This switch is shown as comprising a plunger 21 having the inner end thereof received between two spring contacts 22. An insulating sleeve 23 surrounds a portion of the plunger and when the plunger is moved inwardly the contacts 22 engage the insulating sleeve and the circuit is opened, while when the plunger is pulled outwardly the spring contacts engage the metallic head 24 thereof and the circuit is closed.

Within the tubular arm 1 one of the electric wires 20 is severed and the extremeties thereof provided with contacts 25 which projects from an insulating block 26. These contacts are so arranged as to be engaged by an offset portion $12^b$ of the operating plunger 12 when the said plunger has been moved to swing the semaphore into operative position. This is indicated more clearly by Figure 3. When the semaphore is in inoperative position the said offset plunger $12^b$ of the operating plunger is moved out of engagement with the contacts 25 so that the lamp circuit is automatically broken. It will thus be obvious that when the switch on the dashboard is closed the signal lamp 5 will be automatically controlled by the movements of the operating plunger 12, being flashed when the semaphore is in operative position and extinguished when the semaphore is moved into inoperative position.

It may also be desired to provide means for illuminating the arrow or semaphore so that it can be clearly seen when driving at night. For this purpose the back of the signal lamp may be formed by one or more reflector elements such as those indicated by 27. These reflector elements are hingedly connected at 28 to the lamp and when swung into a closed position practically constitute the back of the lamp casing. A link 29 connects arms 30 on the reflector elements so that they open and close in unison, and one of the reflector elements is provided with a crank arm 31 which is operatively connected by a link 32 to the arm 8 of the semaphore. The arrangement is such that when the semaphore is swung upwardly into a horizontal position the reflectors are simultaneously swung outwardly so that light from the signal lamp will be thrown upwardly toward the semaphore, thereby illuminating the semaphore or arrow so that it will stand out in bold relief against a background of darkness. When the arrow or semaphore is swung downwardly into inoperative position, indicated by dotted lines on Figure 2, the reflector elements 27 are simultaneously swung against the lamp and the lamp itself extinguished.

While one particular embodiment of the invention has been shown and described in detail for illustrative purposes, it will be obvious that many changes and modifications can be made in the details of construction without departing in any manner from the spirit of the invention.

Having thus described my invention, what I claim as new and desire to secure by Letters Patent is:—

1. A vehicle direction indicator including a bracket arm, a signal lamp carried thereby, a semaphore mounted thereon, a plunger slidably mounted upon the bracket arm and operatively connected to the semaphore, and an electric circuit including the signal lamp and provided with spaced contacts, arranged at one side of the plunger in a direction parallel to the movement thereof, the plunger being formed with an offset portion which is arranged to automatically bridge the contacts and flash the signal lamp when the semaphore is moved into operative position.

2. A vehicle direction indicator including a bracket, a lamp carried thereby, a movable semaphore mounted upon the bracket, a movable reflector for the lamp, means for operating the semaphore, and means for automatically moving the reflector to direct light from the lamp upon the semaphore when the latter is in operative position.

3. A vehicle direction indicator including a bracket, a lamp carried thereby, a semaphore mounted thereon, a movable reflector for the lamp, a plunger for operating the semaphore, and means for moving the reflector into and out of operative position simultaneously with the semaphore, said reflector serving to throw light upon the semaphore when the latter is in operative position.

4. A vehicle direction indicator including a bracket, a lamp carried thereby, a swinging reflector normally closing the lamp, a semaphore mounted upon the bracket, means for operating the semaphore, and an operative connection between the semaphore and the reflector whereby the reflector will be swung outwardly to throw light upon the semaphore when the latter is moved in operative position.

5. A vehicle direction indicator including a bracket, a signal lamp thereon, a semaphore mounted thereon, a series of movable reflectors associated with the signal lamp and normally assuming an inoperative position, means for operating the semaphore, and means for simultaneously swinging all of the reflectors into operative position to direct light upon the semaphore.

6. A vehicle direction indicator including a bracket, a lamp carried thereby, a semaphore mounted thereon, means for operating the semaphore, means for automatically flashing the lamp when the semaphore is operated, a normally inoperative reflector associated with the lamp, and means for automatically moving the reflector into position to throw light upon the semaphore when the semaphore is operated.

7. A vehicle direction indicator including a bracket, a lamp carried thereby, a semaphore mounted thereon, a normally inoperative reflector associated with the lamp, means for operating the semaphore, and means for simultaneously moving the reflector into operative position to direct light from the lamp upon the semaphore.

In testimony whereof I affix my signature.

FLOYD KOPPENHAFER.